United States Patent [19]

Asakura et al.

[11] Patent Number: 5,382,382

[45] Date of Patent: Jan. 17, 1995

[54] SHEET-LIKE HEATING ELEMENTS AND PREPARATION THEREOF

[75] Inventors: Toshikage Asakura, Toyonaka; Wolfgang Wernet; Masaki Ohwa, both of Kobe; Kenichiro Kai, Toyonaka, all of Japan

[73] Assignee: Japat Ltd., Basel, Switzerland

[21] Appl. No.: 29,579

[22] Filed: Mar. 11, 1993

[30] Foreign Application Priority Data

Mar. 12, 1992 [JP] Japan .................. 4-087580

[51] Int. Cl.⁶ ............................... H01B 1/00
[52] U.S. Cl. .................... 252/500; 338/205; 338/314; 427/385.5; 428/334
[58] Field of Search ............... 525/279, 284, 291, 298, 525/523, 535; 524/901; 252/500; 338/205, 314; 428/334; 427/372.2, 385.5

[56] References Cited

U.S. PATENT DOCUMENTS

| | | | |
|---|---|---|---|
| 5,061,401 | 10/1991 | Wernet et al. | 252/500 |
| 5,206,297 | 4/1993 | Wernet et al. | 525/279 |
| 5,250,226 | 10/1993 | Oswal et al. | 252/500 |
| 5,286,414 | 2/1994 | Kämpf et al. | 252/500 |

FOREIGN PATENT DOCUMENTS

| | | |
|---|---|---|
| 0106303 | 8/1981 | Japan . |
| 0034604 | 2/1982 | Japan . |
| 1153745 | 6/1989 | Japan . |
| 1213977 | 8/1989 | Japan . |

OTHER PUBLICATIONS

Hitachi Cable Ltd., Chemical Abstracts, vol. 110 (1989), p. 762 Abstract No. 184237b Abstracting JP 63-0279588.

Showa Denka KK, Derwent Abstracts 87-346446/49 Abstracting JP 62 252089.

Primary Examiner—Tae H. Yoon
Attorney, Agent, or Firm—Wenderoth, Lind & Ponack

[57] ABSTRACT

A sheet-like heating element using an electrically conductive polymer complex consisting of a) a polycation of polyheteroaromatic compound; and b) a polyanion of thermoplastic polymer, containing a sulfated alcohol group in the repeating structural unit, having film-forming properties.

16 Claims, No Drawings

SHEET-LIKE HEATING ELEMENTS AND PREPARATION THEREOF

This invention relates to a sheet-like heating element having excellent mechanical properties and high workability and to a process for preparing the same.

As electric heating elements those comprising electrically conductive polymer materials containing a polymer material and a conductive filler, such as carbon black and graphite, and those comprising a resin such as polyester and a semiconductor such as indium oxide or gold deposited thereon are well known. However, these heating elements all suffer of the problem that they cannot give a sufficient heating value at a low voltage, so that the thickness of the heating elements must be increased.

Also known is a sheet-like heating element prepared by electrolytical polymerization of an electrically conductive aromatic polymer compound such as a polypyrrole or a reinforcing substrate with a view to improve mechanical properties of the heating element (Japanese Unexamined Patent Publication No. 279588/1988). However, this type of heating element also suffers from the problem that the manufacturing process becomes intricate since the electrically conductive polymer molecules must be polymerized onto the resin substrate.

Another sheet-like heating element comprising a complex prepared by subjecting a thermoplastic resin film such as of polyvinyl chloride and a polymer having an isothianaphthene structure doped with an organic acid anion such as of p-toluenesulfonic acid to electrolytic polymerization is known (Japanese Unexamined Patent Publication No. 252089/1987). However, this heating element involves an intricate manufacturing process like the above sheet-like heating element and disadvantageously shows insufficient mechanical properties and workability including thermoformability.

It is an object of this invention to provide a sheet-like heating element having excellent mechanical properties including breaking strength and tensile strength at break, excellent workability including thermoformability and adhession to substrates and also excellent electrical properties including conductivity. A further object is to provide a sheet-like heating element with an improved power output and uniform heating of the surface.

A first aspect of this invention is a sheet-like heating element of an electrically conductive polymer composition comprising:
a) a polycation of a polyheteroaromatic compound; and
b) a polyanion of a thermoplastic polymer containing a sulfated alcohol group in the repeating structural unit thereof and having film-forming properties with or without support.

A second aspect of this invention is a sheet-like heating element in the form of an electrically conductive polymer composition with or without support comprising
a) a polycation of a polyheteroaromatic compound and
b) a polyanion of thermoplastic polymer containing a sulfated alcohol group in the repeating structural unit thereof and having film-forming properties, whereby the element is connected with a positive and negative electrode.

A third aspect of this invention is a process for preparing a sheet-like heating element, which comprises forming an electrically conductive polymer composition into a sheet with or without a support by means of a heat roll or a heat press.

A fourth aspect of this invention is a process for preparing a sheet-like heating element, wherein a film of the electrically conductive polymer composition is subjected to a thermocompression bonding with a conductive or resistant metal.

A fifth aspect of this invention is the use of an electrically conductive polymer composition with or without support comprising
a) a polycation of a polyheteroaromatic compound and
b) a polyanion of thermoplastic polymer containing a sulfated alcohol group in the repeating structural unit thereof and having film-forming properties in the form of a sheet or film or a support coated with said polymer composition, which is connected with a positive and negative electrode as an heating element.

A sixth aspect of the invention is a process for heating the environment with a heat source wherein an electrically conductive polymer composition with or without support comprising
a) a polycation of a polyheteroaromatic compound and
b) a polyanion of thermoplastic polymer containing a sulfated alcohol group in the repeating structural unit thereof and having film-forming properties is connected with two electrodes, and applying electrical power to heat the sheet-like heating element.

This invention will be described below in more detail.

As the electrically conductive polymer composition to be employed according to this invention, those described in EP-A-0 358 188 can be used.

It should be appreciated that the polyheteroaromatic compound to be employed according to this invention means a homopolymer or a copolymer, containing a repeating structural unit of heteroaromatic group. Such compounds are polymers having high molecular weights or oligomers, provided that they are solid at room temperature and have film-forming properties.

Suitable polyheteroaromatic compounds contain 1 to 3, preferably 1 hetero atoms selected from the group consisting of O, S and N, and 5- or 6-membered rings, in which the carbon atoms are unsubstituted or substituted with $C_1$–$C_{16}$alkyl, preferably with $C_1$–$C_{12}$alkyl. Preferably, two of the carbon atoms are unsubstituted so as to allow an electrochemical polymerization to take place. The 5- or 6-membered ring is preferably selected from the group consisting of pyrroles, thiophenes, furans, 2,2'-bipyrroles, 2,2'-bithiophenes, 2,2'-bifurans, thiazoles, oxazoles, thiadiazoles and imidazoles.

The polyheteroaromatic compound may particularly preferably be of a pyrrole represented by the formula:

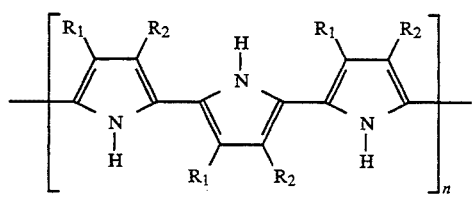

wherein $R_1$ and $R_2$ each and independently represent hydrogen or $C_1$–$C_{16}$alkyl. $R_1$ and $R_2$ may be $C_1$–$C_{12}$alkyl, for example, methyl or ethyl, and preferably hydrogen. The NH group in the pyrrole may be substituted with $C_1$–$C_{12}$alkyl, preferably with $C_1$–$C_6$alkyl.

The composition to be employed according to this invention has a structural unit of thermoplastic polymer containing a sulfated alcohol group represented by the formula:

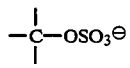

preferably in an amount of 0.1 to 0.5, and most preferably in an amount 0.2 to 0.4 per structural unit of the polyheteroaromatic compound.

The sulfated alcohol group-containing thermoplastic polymer suitably employed according to this invention has a glass transition temperature of $-200°$ to $350°$ C., more preferably $-100°$ to $250°$ C. as measured by differential scanning calorimetry (DSC).

The polymerization degree of the thermoplastic polymer may be, for example, 5 to 10,000, preferably 10 to 5,000, and most preferably 10 to 1,000.

Such thermoplastic polymer preferably has a tensile strength of 5 MPa or more, particularly 20 MPa or more. The polymer may have a higher tensile strength of up to 1,000 MPa, preferably up to 500 MPa, most preferably up to 300 MPa, depending on the nature of the polymer.

The molar ratio of the free alcohol group to the sulfated alcohol group in the thermoplastic polymer is, for example, 50:1 to 1:50, preferably 10:1 to 1:10.

The sulfated alcohol group may be present at the terminal end position in the polymer backbone in the form of:

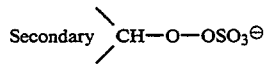

at the side chain in the form of a primary'$C$-$H_2$—O—$SO_3$—; or at the middle position in the form of:

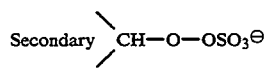

or in the form of:

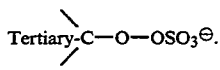

The thermoplastic polymer can be derived from polymers containing different hydroxyl groups or mixtures thereof, for example, polyesters, polyester amides, polyurethanes, polyamides, polycarbonates and polyimides, obtained from hydroxyl-containing monomers; saponified polymers of vinyl esters or ethers; hydroxylated polyolefins such as polybutadiene, polyisoprene and chloroprene; polyacrylates or polymethacrylates containing hydroxyl groups in the ester moiety, polysiloxanes containing hydroxyalkyl groups, hydroxylated polyketones whose carboxyl groups are reduced or copolymers thereof; as well as copolymers of at least one monomer selected from the group consisting of vinyl alcohols, acrylates, methacrylates and diolefins with at least one comonomer selected from the group consisting of acrylonitrile, olefins, diolefins, vinyl chloride, vinylidene chloride, vinyl fluoride, vinylirene fluoride, styrenes, a-methylstyrene, maleic anhydride, maleimide, vinyl ethers and vinyl esters.

The sulfated alcohol group-containing thermoplastic polymer is preferably derived from polymers selected from the group consisting of polyadducts of glycidyl compounds having on an average more than one epoxy group with a diol; homopolymers of hydroxyalkyl acrylates or methacrylates or copolymers thereof, homopolymers of butadiene, isoprene and chloroprene whose double bonds are hydroxylated or copolymers thereof; polyimides of hydrogenated ketotetracarboxylic acids, especially of benzophenonetetracarboxylic acid; hydroxyalkyl polysiloxanes; and polyesters, polyamides, polyurethanes and polyimides from $C_4$–$C_{12}$alkenylendiols or $C_4$–$C_{12}$alkenylenediamines whose double bonds are hydroxylated.

The thermoplastic polymer may be, for example, an at least partially sulfated polyadduct of (a) a glycidyl compound which contains on an average more than one epoxy group; and (b) a diol containing the following group:

in the polymer chain.

The polyadduct is preferably derived from glycidyl compounds having on an average two epoxy groups in the molecule.

Particularly suitable glycidyl compounds are those containing two glycidyl, $\beta$-methylglycidyl or 2,3-epoxycyclopentyl groups attached to a hetero atom (for example, a sulfur atom, preferably an oxygen or nitrogen atom). Such compounds are in particular bis(2-,3epoxycyclopentyl) ethers; diglycidyl ethers of polyhydric aliphatic alcohols such as 1,4-butanediol or of polyalkylene glycols such as polypropylene glycols; diglycidyl ethers of cycloaliphatic polyols such as 2,2-bis(4-hydroxycyclohexyl)propane; diglycidyl ethers of polyhydric phenols such as resorcinol, bis(hydroxyphenyl)-methane, 2,2-bis(p-hydroxyphenyl)propane(diomethane), 2,2-bis(4'-hydroxy-3,5'-dibromophenyl)-propane, 1,2-bis(p;hydroxyphenyl)ethane; bis($\beta$-methylglycidyl) ethers of the above-mentioned dihydric alcohols or dihydric phenols, diglycidyl esters of dicarboxylic acids such as phthalic acid, terephthalic acid, $\Delta^4$-tetrahydrophthalic acid and hexahydrophthalic acid; N,N-diglycidyl derivatives of primary amines and amides and of heterocyclic nitrogen bases containing two nitrogen atoms and N,N'-diglycidyl derivatives of di-secondary diamides and diamines such as N,N-diglycidylaniline, N,N-diglycidyltoluidine, N,N-diglycidyl-p-aminophenylmethyl ether and N,N'-dimethyl-N,N'-diglycidyl-bis(p-aminophenol)methane; N',N''-diglycidyl-N-phenylisocyanurate; N,N'-diglycidylethyleneurea, N,N'-diglycidyl-5,5-dimethylhydantoin, N,N'-diglycidyl-5-isopropylhydantoin, N,N-methylene-bis-(N',N'-diglycidyl-5,5-dimethylhydantoin), 1,3-bis(N-glycidyl-5,5-dimethylhydantoin)-

2-hydroxypropane, N,N'-diglycidyl-5,5-dimethyl-6-isopropyl-5,6-dihydrouracyl.

The glycidyl compounds can be reacted with aliphatic, cycloaliphatic or aromatic diols to the preferred polyadducts. The thus obtained polyadducts can readily be sulfated according to a known reaction.

The glycidyl compounds can also be reacted with primary aliphatic, cycloaliphafic or aromatic monoamines (for example, aniline, toluidine, $C_1$–$C_{12}$alkylamines and $C_2$–$C_{12}$hydroxyalkylamines); aliphatic, cycloaliphatic or aromatic dicarboxylic acids (for example, maleic acid, adipic acid, trimethyladipic acid, sebacic acid, azelaic acid, succinic acid, dodecylsuccinic acid, phthalic acid, terephthalic acid, $\Delta^4$-tetrahydrophthalic acid, hexahydrophthalic acid, 4-methylhexahydrophthalic acid, 3,6-endomethylene-$\Delta^4$-tetrahydrophthalic acid and 4-methyl-3,6-endomethylene-$\Delta^4$-tetrahydrophthalic acid); or with aliphatic, cycloaliphatic, heterocyclic or aromatic di-secondary amines or di-secondary carboxamides (for example, N,N'-dimethylethylenediamine, N,N'-dimethylpropylene-1,3diamine, N,N'-dimethylhexamethylenediamine, N,N'-dicyclohexylhexamethylenediamine, N,N',N''-trimethyldiethylenetriamine, N,N'-diethylpropylene-1,3-diamine and N-methyl-3,5,5-trimethyl-3-(methylaminomethyl)-cycloheyalamine), and N,N'-di-methylated or N,N'-diethylated aromatic diamine (for example, m- or p-phenylenediamine, bis(4-aminophenyl)methane or -sulfone, 2,2-bis(4-aminophenyl)propane and N,N-di-methyl-mxylylenediamine); as well as ethyleneurea, 5,5-dimethylhydantoin, 5-isopropylhydantoin, N-N-methylene-bis-5,5-dimethylhydantoin, 1,3-bis(5,5-dimethyl)-2-hydroxy-propane or 5,5-dimethyl-6-isopropyl-5,6-dihydrouracyl), by polyaddition to give linear polyadducts.

A complex to be suitable employed according to this invention is one in which the polyadduct contains:

a) 100 to 5 mol % of identical or different structural units of the formula (I):

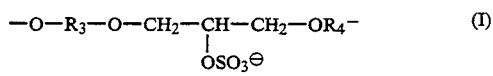

wherein $R_3$ and $R_4$ each and independently represent a radical of an aliphatic or aromatic diol group which radical is diminished by two hydroxyl groups; and b) 95 to 0 mol % of identical or different structural units of the formula (II):

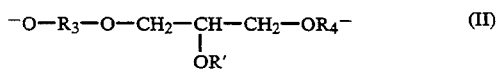

wherein $R_3$ and $R_4$ have the same meanings as defined above; R' represents hydrogen, $C_1$–$C_{20}$alkyl group, $C_1$–$C_{20}$acyl or aminocarbonyl which is N-substituted with $C_1$–$C_{20}$hydrocarbon group, based on the polyadduct.

Suitable polyadducts contain 90 to 20 mol %, preferably 80 to 30 mol %, of the structural units of the formula (I) and 80 to 10 tool %, preferably 70 to 20 mol %, of the structural units of the formula (II).

In a preferred embodiment of the invention, $R_3$ and $R_4$ are identical groups. $R_3$ and $R_4$ as aliphatic diol groups may preferably have 2 to 12, most preferably 2 to 8 carbon atoms. The hydroxyl groups may be attached to open-chain or cycloaliphatic group. Suitable aliphatic group is typically a linear or branched $C_2$–$C_{12}$alkylene, $C_3$–$C_8$cycloalkylene, $C_1$–$C_4$alkyl-substituted $C_6$–$C_8$cycloalkyl, cyclohexylmethylene or cyclohexyldimethylene.

The above groups can specifically be exemplified by ethylene, 1,2- or 1,3-propylene, 1,2-, 1,3- or 1,4-butylene, 1,2-, 1,3-, 1,4-or 1,5-pentylene, 1,2-, 1,3-, 1,4-, 1,5- or 1,6-hexylene, heptylene, octylene, nonylene, decylene, undecylene, dodecylene, 1,3-cyclopentylene, 1,3- or 1,4-cyclohexylene, 2-methyl-1,4-cyclohexylene and cyclohexyl-1,4-dimethylene.

R' as $C_1$–$C_{20}$alkyl may be linear or branched. R' as acyl may be $C_1$–$C_{20}$alkyl-CO—, $C_5$–$C_8$cycloalkyl-$CH_2$—CO—, $C_1$–$C_{15}$alkyl-substituted $C_5$–$C_8$cycloalkyl-CO, $C_5$–$C_8$cycloalkyl-$CH_2$-CO—, $C_1$–$C_{14}$alkyl-substituted $C_5$–$C_8$cycloalkyl-$VH_2$—CO—, phenyl-CO—, benzyl-CO— or $C_1$–$C_{14}$alkyl-substituted phenyl-CO— or $C_1$–$C_{14}$alkyl-substituted benzyl-CO—. The hydrocarbon group in the aminocarbonyl may be $C_1$–$C_{20}$alkyl—, $C_5$–$C_8$cycloalkyl—, $C_1$–$C_{15}$alkyl-substituted $C_5$–$C_8$cycloalkyl—, $C_5$–$C_8$cycloalkyl-$CH_2$-, $C_1$–$C_{14}$alkyl-substituted $C_5$–$C_8$cycloalkyl-$CH_2$-, phenyl, benzyl, $C_1$–$C_{14}$alkyl-substituted phenyl or $C_1$–$C_4$alkyl-substitute benzyl. R' is preferably hydrogen.

The aromatic diols used for the polyadducts are preferably phenolic groups. The diol groups having phenolic groups preferably contain 6 to 30, most preferably 6 to 20, carbon atoms. In a preferred embodiment of the invention, $R_3$ and $R_4$ each and independently has a group represented by the formula (III):

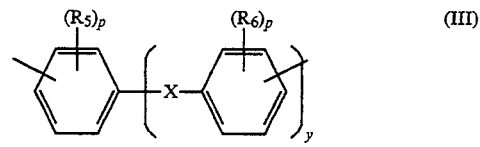

wherein X is a direct bond, $C_1$–$C_4$alkylene, $C_2$–$C_{12}$alkylidene, $C_5$–$C_8$cycloalkylidene, —O—, —S—, —SO—, —$SO_2$—, —CO—, —$CO_2$—, —N($C_1C_4$alkyl)- or —Si($CH_3$)$_2$—; $R_5$ and $R_6$ each and independently represent hydrogen, halogen, $C_1$–$C_4$alkyl or $C_1$–$C_4$alkoxy; p is 1 or 2; and y is 0 or 1.

X preferably represents a direct bond, methylene, ethylene, $C_2$–$C_6$alkylidene, cyclohexylidene, cyclopentylidene, —O—or —S—; $R_5$ and $R_6$ each preferably represent hydrogen or methyl; and y is preferably 1.

$R_3$ and $R_4$ each preferably represent a group of the formula:

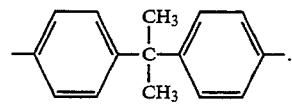

In a composition to be suitably employed according to this invention, the thermoplastic polymer is an at least partially sulfated homopolymer or copolymer of an acrylate or methacrylate containing a group of the formula:

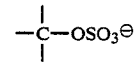

in the ester moiety. A preferred complex of this type is one in which the thermoplastic polymer contains:

a) 100 to 5 mol % of identical or different structural units of the formula (IV):

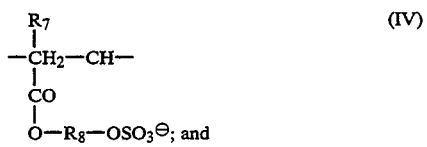

b) 95 to 0 mol % of identical or different structural units of the formula (V):

based on the polymer.

In the formulae (IV) and (V), $R_7$ represents hydrogen or methyl; $R_8$ represents linear or branched $C_2$-$C_{18}$alkylene, poly($C_2$-$C_6$oxaalkylene) containing 2 to 6 oxaalkylene units, $C_5$-$C_8$cycloalkylene, phenylene, benzylene or xylylene; or a group of the formula:

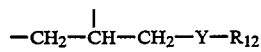

wherein Y represents —O—, —OCO— or —N($C_1$-$C_4$alkyl)—; $R_{12}$ represents $C_1$-$C_{18}$alkyl, $C_5$-$C_7$cycloalkyl, $C_1$-$C_{12}$alkyl-substituted $C_5$-$C_7$cycloalkyl, phenyl, $C_1$-$C_{12}$alkyl-substituted phenyl, benzyl or $C_1$-$C_{12}$alkyl-substituted benzyl; $R_9$ represents hydrogen, $C_1$-$C_6$alkyl, —COOR$_{12}$ or —COO—; $R_{10}$ represents hydrogen, fluorine, chlorine, cyano or $C_1$-$C_6$alkyl; $R_{11}$ represents hydrogen, fluorine, chlorine, cyano, $R_{12}$O—, $C_1$-$C_{12}$alkyl, —COO—, —COOR$_{12}$, —COOR$_8$—OH, —OCO—R$_{12}$ or phenyl ($R_8$ and $R_{12}$ have the same meanings as defined above).

The thermoplastic polymer preferably contains 90 to 20 mol % of the structural unit of the formula (IV), most preferably 80 to 30 mol %, and also 80 to 10 mol %, most preferably 70 to 20 mol %, of the structural unit of the formula (V).

$R_8$ as alkylene preferably has 2 to 12, particularly 2 to 8, and most Preferably 2 to 6 carbon atoms. $R_8$ as alkylene typically includes ethylene and isomers of propylene, butylene, pentylene, hexylene, heptylene, octylene, nonylene, decylene, undecylene, dodecylene, tetradecylene, hexadecylene and octadecylene, preferably ethylene, 1,2- and 1,3-propylene, 1,2-, 1,3- and 1,4-butylene, 1,2-, 1,3-, 1,4- and 1,5-pentylene and 1,2-, 1,4-, 1,5-and 1,6-hexylene.

$R_8$ as poly(oxaalkylene) preferably has 2 to 4 oxaalkylene units and 2 to 4, more preferably 2 or 3 carbon atoms in the alkylene moiety.

$R_8$ as cycloalkylene preferably is cyclopentylene or cyclohexylene.

Polymers in which $R_8$ represents a group of the formula:

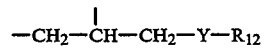

are reaction products of glycidyl esters of poly- or copoly(meth)acrylic acid with a compound $R_{12}$-Y-H containing active hydrogen.

Y preferably represents —O— or —OCO—. $R_{12}$ may be linear or branched alkyl having 1 to 18, preferably 1 to 12, and most preferably 1 to 6 carbon atoms. $R_{12}$ as cycloalkyl preferably is cyclopentyl or cyclohexyl. Where $R_{12}$ is $C_1$-$C_{12}$alkyl-substituted cycloalkyl, the cycloalkyl moiety is preferably cyclopentyl or cyclohexyl, and the alkyl moiety may be linear or branched and preferably has 1 to 6, and most preferably 1 to 4, carbon atoms. Where $R_{12}$ is alkyl-substituted phenyl or alkyl-substituted benzyl, the alkyl moiety may be linear or branched and has preferably 1 to 6, and most preferably 1 to 4, carbon atoms.

$R_9$ is preferably hydrogen. $R_9$ as alkyl preferably is methyl or ethyl. Where $R_9$ is —COOR$_{12}$, $R_{12}$ is preferably $C_1$-$C_{12}$alkyl, and most preferably $C_1$-$C_6$alkyl.

$R_{10}$ as alkyl is preferably $C_1$-$C_4$alkyl, typically methyl, ethyl, n-propyl or n-butyl. $R_{10}$ is preferably hydrogen, chlorine or $C_1$-$C_4$alkyl.

Where $R_{11}$ is the group $R_{12}$O—, $R_{12}$ is preferably $C_1$-$C_{12}$alkyl more preferably $C_1$-$C_6$alkyl. $R_{11}$ as alkyl preferably has 1 to 6, and most preferably 1 to 4, carbon atoms. Where $R_{11}$ is the group —COOR$_{12}$, $R_{12}$ is preferably $C_1$-$C_{12}$alkyl, and most preferably $C_1$-$C_6$alkyl, cyclopentyl or cyclohexyl. Where $R_{11}$ is —OCO-R$_{12}$, $R_{12}$ is preferably $C_1$-$C_{12}$alkyl, and most preferably $C_1$-$C_6$alkyl, phenyl or benzyl.

When $R_{11}$ represents the group —COOR$_8$—OH, $R_8$ has the same meaning as defined above.

In a particularly preferred embodiment of the invention, $R_9$ is hydrogen, fluorine, chlorine, methyl or ethyl; and $R_{11}$ is fluorine, chlorine, cyano, $C_1$-$C_4$alkyl, $C_1$-$C_6$alkoxy, —COO-$C_1$-$C_6$alkyl, —COO-R$_8$-OH, —OCO-$C_1$-$C_6$alkyl or phenyl.

Particularly preferred complex is one wherein, the thermoplastic polymer has the structural units of the formula (IV) (wherein $R_7$ represents hydrogen or methyl; and $R_8$ represents linear or branched $C_2$-$C_6$alkylene, cyclopentylene or cyclohexylene) and the structural units of the formula (V) (wherein $R_9$ represents hydrogen; $R_{10}$ represents hydrogen or methyl; and $R_{11}$ represents —COOR$_{12}$ or —COOR$_8$-OH).

In a more preferred embodiment of the invention, the thermoplastic polymer contains:

a) identical or different structural units of the formula (VI):

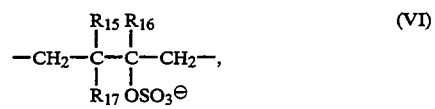

wherein $R_{15}$, $R_{16}$ and $R_{17}$ each and independently represent hydrogen, $C_1$-$C_{20}$alkyl or halogen;

b) identical or different structural units of the formula (VII):

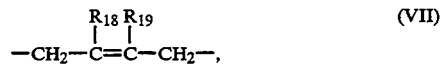

wherein $R_{18}$ and $R_{19}$ each and independently represent hydrogen, $C_1$-$C_{20}$alkyl or halogen; and c) identical or different structural units of the formula (VIII):

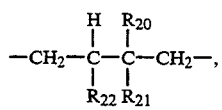

$$-CH_2-\underset{\underset{R_{22}}{|}}{\overset{\overset{H}{|}}{C}}-\underset{\underset{R_{21}}{|}}{\overset{\overset{R_{20}}{|}}{C}}-CH_2-, \quad \text{(VIII)}$$

wherein $R_{20}$ represents hydrogen, fluorine, chlorine, cyano or $C_1$-$C_6$alkyl; $R_{21}$ represents hydrogen, fluorine, chlorine, cyano, $R_{120}$—, $C_1$-$C_{12}$alkyl-, —COO—,—COOR$_{12}$,-COOR$_8$-OH, —OCO-R$_{12}$ or phenyl; and $R_{22}$ represents hydrogen, $C_1$-$C_6$alkyl-,—COOR$_{22}$ or—COO— wherein $R_8$ and $R_{12}$ have the same meanings as defined above).

The most preferred embodiment of the invention relates to a complex in which the thermoplastic polymer is an at least partially sulfated polyvinyl alcohol or a copolymer thereof containing the group:

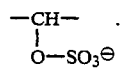

$$-\underset{\underset{O-SO_3^{\ominus}}{|}}{CH}-.$$

Preferably, the complex contains a polyvinyl alcohol copolymer.

A preferred composition contains:

a) 90 to 5 mol % of the structural units of the formula (VI):

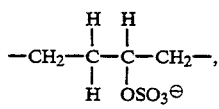

$$-CH_2-\underset{\underset{H}{|}}{\overset{\overset{H}{|}}{C}}-\underset{\underset{OSO_3^{\ominus}}{|}}{\overset{\overset{H}{|}}{C}}-CH_2-, \quad \text{(VI)}$$

b) 95 to 10 mol % of identical or different structural units of the formula (V):

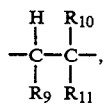

$$-\underset{\underset{R_9}{|}}{\overset{\overset{H}{|}}{C}}-\underset{\underset{R_{11}}{|}}{\overset{\overset{R_{10}}{|}}{C}}-, \quad \text{(V)}$$

wherein $R_9$, $R_{10}$ and $R_{11}$ have the same meanings as defined above.

Preferably, the copolymer contains 70 to 10 mol %, most preferably 60 to 20 mol % of the structural units of the formula (VI), and 30 to 90 mol %, most preferably 40 to 80 mol % of the structural units of the formula (V).

In a particularly preferred complex, $R_9$ and $R_{10}$ each represent hydrogen; and $R_{11}$ represents—OCOR$_{12}$ (wherein $R_{12}$ represents $C_1$-$C_{18}$alkyl, $C_5$-$C_7$cycloalkyl, $C_1$-$C_{12}$alkyl-substituted $C_5$-$C_7$cycloalkyl, phenyl, benzyl, $C_1$-$C_{12}$alkyl-substituted phenyl or $C_1$-$C_{12}$alkyl-substituted benzyl.

The sulfated alcohol group may be present at the terminal end position of the polymer backbone in the form of:

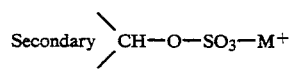

$$\text{Secondary} \diagdown_{\diagup}^{\diagdown} CH-O-SO_3-M^+$$

wherein M$^+$ represents an alkali metal cation or an ammonium cation; or at the side chain in the form of primary-CH$_2$—O—SO$_3$—M$^+$; or at the middle position in the form of:

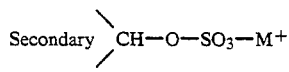

$$\text{Secondary} \diagdown_{\diagup}^{\diagdown} CH-O-SO_3-M^+$$

wherein M$^+$ has the same meaning as defined above, or in the form of:

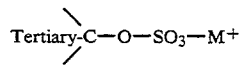

$$\text{Tertiary-}C-O-SO_3-M^+$$

wherein IV[$^+$ has the same meaning as deemed above,

The ammonium cation may be NH$_4^+$, a protanated primary, secondary or tertiary amine, or quaternary ammonium or pyridinium. The primary amine may contain 1 to 18, preferably 1 to 12, and most preferably 1 to 6, carbon atoms; the secondary amine may contain 2 to 24, preferably 2 to 12, and most preferably 2 to 8, carbon atoms; the tertiary amine may contain 3 to 30, preferably 3 to 18, and most rpeferably 3 to 12, carbon atoms; and the quaternary ammonium may contain 4 to 36, preferably 4 to 24, and most preferably 4 to 18, carbon atoms.

Preferred thermoplastic polymers are those wherein M$^+$ is Li$^+$, Na$^+$ or K$^+$, or a group of the formula:

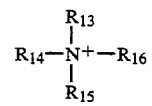

$$R_{14}-\underset{\underset{R_{15}}{|}}{\overset{\overset{R_{13}}{|}}{N^+}}-R_{16}$$

wherein $R_{13}$, $R_{14}$, $R_{15}$ and $R_{16}$ each and independently represent hydrogen, unsubstituted or hydroxyl-substituted $C_1$-$C_{18}$alkyl, phenyl, $C_1$-$C_{12}$alkyl-substituted phenyl, $C_1$-$C_{12}$-alkyl-substituted benzyl, $C_5$-$C_7$cycloalkyl, $C_1C_{12}$alkyl-substituted $C_5$-$C_7$cycloalkyl; or $R_{13}$ and $R_{14}$ may be combined and together represent tetramethylene, pentamethylene or 3-oxapentylene; and $R_{15}$ and $R_{16}$ ahve the same meanings as defined above.

A preferred embodiment of this invention relates to polymers in which at least one of $R_{13}$ to $R_{16}$ is not hydrogen.

$R_{13}$ to $R_{16}$ as alkyl may be linear or branched and preferably have 1 to 12, and most preferably 1 to 6, carbon atoms. Such groups may typically be exampli-fied by methyl, ethyl, n- and isopropyl, n-butyl, isobutyl and tert-butyl, pentyl, hexyl, heptyl, octyl, nonyl, decyl, dodecyl, dodecyl, tetradecyl, hexadecyl and octadecyl.

$R_{13}$ to $R_{16}$ as hydroxyalkyl may be linear or branched and preferably contains 2 to 18, particularly 1 to 12, and most preferably 2 to 6 carbon atoms. Such groups may typically be exemplified by 2-hydroxyethyl, 1- or 2-hydroxypropyl, 1-hydroxybutyl and 1-hydroxyhexyl.

The alkyl-substituted phenyl and alkyl-substituted benzyl can be exemplified by methylphenyl, dimethylphenyl, ethylphenyl, n- or isopropylphenyl, n—, iso- or tert-butylphenyl, hexylphenyl, octylphenyl, decylphenyl, dodecylphenyl and suitably alkyl-substituted benzyl.

$R_{13}$ to $R_{16}$ as cycloalkyl are preferably cyclopentyl or cyclohexyl.

$R_{13}$ to $R_{16}$ as alkylcycloalkyl each are preferably $C_1$-$C_{12}$alkyl-substituted cyclopentyl or $C_1$-$C_{12}$alkyl-substituted cyclohexyl.

Most preferably, $R_{13}$ to $R_{16}$ each represent $C_1$-$C_6$alkyl.

The thermoplastic polymers which can suitably be used according to this invention may be prepared by a known method by reacting a thermoplastic polymer having film-forming properties and containing an alcohol group in the repeating structural unit thereof with $SO_3$ in an inert solvent, and neutralizing the reaction mixture with an alkali metal base or an ammonium base, followed by isolation of the polymer.

The above method is known. For example, $SO_3$ can be introduced in the gaseous form into the reaction mixture. It is advantageous to use a commercially available pyridine/$SO_3$complex.

Suitable inert solvents are preferably polar aprotic solvents. A suitable solvent is selected depending mainly on the solubility of the hydroxyl group-containing polymer. The solvent may be used singly or as a mixture of at least two solvents. Suitable solvents may typically be exemplyfied by ethers such as dibutyl ether, tetrahydrofuran, dioxane, methylene glycol, dimethyl ethylene glycol, dimethyl dimethylene glycol, diethyl diethylene glycol and dimethyl triethylene glycol; halogenated hydrocarbons such as methylene chloride, chloroform, 1,2-dichloroethane, 1,1,1-trichloroethane and 1,1,2,2-tetrachloroethane; and lactones such as γ-butyrolactone, o-valerolactone and pivalolactone; carboxamide and lactams, for example, N,N-dimethylformamide, N,N-diethylformamide, N,N-dimethylacetamide, N-methyl-7-butyrolactam, N-methyl-ecaprolactam, N-methylpyrrolidone, N-acetylpyrrolidone, tetramethylurea and hexamethylphosphoramide; sulfoxides such as dimethyl sulfoxide, sulfones such as dimethyl sulfone, diethyl sulfone, trimethyl sulfone and tetramethylene sulfone; N-methylpyrrolidine, N-methylpiperidine, N-methylmorpholine; and substituted benzenes such as benzonitrile, chlorobenzene, o-dichlorobenzene, 1,2,4-trichlorobenzene and nitrobenzene.

The reaction temperature is, for example, in the range of 20° to 150° C., preferably 40° to 100° C. The reaction time is about 5 to 10 hours. After completion of the reaction, the reaction mixture is neutralized with an alkali metal base or ammonium hydroxide when a gaseous $SO_3$ is used, or with an aqueous or organic solvent solution of an amine hydroxide. When an amine/$SO_3$ complex, for example, a pyridine/$SO_3$ complex is used, the corresponding ammonium salt is formed. The thus obtained ammonium salt can directly be used in the electrochemical process. It is also possible to replace the ammonium groups in the salts by stronger bases. The salts of the sulfated polymers are usually precipitated with water. The polymer is then isolated by filtration, and can be purified by washing with water or an organic non-solvent, followed by drying.

The polyolefins can also be prepared, for example, by radical polymerization of acrylates or methacrylates containing —O—$SO_3^{M+}$ in the ester moiety without or together with olefin comonomers.

Suitable salts of the sulfated alcohol group-containing polymers also have thermoplasticity. Compared with the starting polymers, their glass transition temperature is substantially unchanged, and the latter can be distinguished from the former by the mechanical properties such as the higher tensile and flexual strength and high flexibility. These salts are polyanions which are very suitable for the electrically conductive polycations of polyheteroaromatic compounds.

The electrically conductive polymer complex to be used according to this invention can be prepared in a manner known per se by subjecting a heteroaromatic compound to electrochemical polymerization in an aqueous, aqueous-organic or organic solvent in the presence of a salt of a sulfated alcohol group-containing polymer, followed by separation of the complex from the anode. The complex is normally deposited in the form of film which, depending on the duration of electrochemical polymerization and current density, may have a thickness of, for example, 1 to 500 μm or 10 to 300 gm. A continuous film can readily be formed by carrying out the electrochemical polymerization continuously.

The electrochemical polymerization can be carried out potenfiostatically or glavanostatically. Suitable anode materials are, for example, metals such as titanium, nickel, platinum and steel, or ITO glass. The current density can be, for example, from 0.5 to 20 mA/$cm^2$, preferably from 1 to 5 mA/$cm^2$.

The electrochemical polymerization can also be carried out in water or in an aqueous-organic solvent. The concurrent use of buffers is expedient. Suitable buffers are typically alkylammonium phosphates having 1 to 3, preferably 2 or 3 alkyl groups in the ammonium moiety, which alkyl group may contain 1 to 6, preferably 1 to 4 carbon atoms. Suitable buffers typically include, for example, trimethylammonium phosphate, triethylammonium phosphate, tri-n-propylammonium phosphate and tri-n-butyl-ammonium phosphate. Suitable buffers are protonated form of cation exchangers.

It is also possible to add to the reaction mixture further substances which deposit concurrently on the anode, for example, anionic plasticizers or anionic dyes. After completion of the electrochemical polymerization, the resulting composition can be separated or peeled off from the anode in the form of film and purified by washing with a solvent.

The present composition usually has a high electric conductivity of 0.1 S/cm or more. Further, the composition has valuable mechanical properties such as high toughness, tensile strength, flexual strength and flexibility. The composition surprisingly has a low glass transition temperature, and therefore it can be subjected to thermoplastic molding without losing its electrical conductivity even at a low polyanion concentration.

The present composition can be processed by methods for thermoplastic polymers, for example, by molding methods, particularly preferably drawing methods (deep drawing) at a temperature of not higher than the melting and decomposition temperatures within the range of the glass transition temperature.

Electric conductivity is increased by the drawing as well as mechanical strength. When the composition is subjected to drawing, for example, at 100° C., the electric conductivity of the complex may occasionally be increased to 5 times as much as that of the undrawn composition.

The sheet-like heating element according to this invention can be used as such in the form of film or together with a support. Lamination of the film onto the support can readily be carded out by means of a heat roll, heat press, etc. The processing is carded out at a temperature of higher by 10° C. than the glass transition temperature and below the decomposition temperature of the polyanion. The pressure to be applied during processing is such that the film itself may not be damaged and preferably 50 kg/cm² or less. Metal terminals fitted to the electrically conductive composition can be exemplified by metal nets, metal ribbons or metal wires. The metal for the metallic terminals includes conductive and resistant metals, such as gold, silver, copper, stainless steel, etc. These metals can readily be fixed to the electrically conductive complex film only by thermocompression bonding with good electrical contact achieved therebetween. Application of a conductive paste such as a silver paste and a carbon paste onto the metal terminals fixed by thermocompression bonding is preferred so as to achieve connnection with substantially no contact resistance. Suitable supports may also be metal alloys.

Other suitable supports are dielectrical materials such as ceramics, glass, minerals, wood, inorganic carbides and nitrides and plastics; or semiconductive materials such as from Be, B and Si.

The thickness of the electrically conductive composition can easily be adjusted by controlling the duration of electrochemical polymerization. While the sheet-like heating element preferably has a thickness of 5 mm or less, the present heating element more preferably has a thickness of 1 mm or less since it has high electric conductivity. The thickness may be from 0.01 to 5 mm, preferably 0.1 to 1 mm. The thickness of coatings may be from 0.001 to 1 mm, preferably 0.01 to 1 mm.

The present sheet-like heating element can be used at a temperature below the decomposition temperature of the polyanion, preferably below the glass transition temperature of the polyanion, more preferably at 100° C. or less.

Sheet-like heating elements having different properties can be formed by changing the kind of polyanion. For example, a composition prepared by using a butadiene derivative as the polyanion has very high ductility, providing excellent workability. Meanwhile, a composition prepared by using an analog of polyvinyl chloride as the polyanion can impart flameretardancy to the heating element.

The present sheet-like heating element can be utilized, for example, for industrial applications, as a heating source for constantly heating reaction vessels at a mild temperature or for evaporating low-boiling point solvents, or in the apparatus which are liable to be corroded by seawater or by watering; for agricultural applications, as a heating source for growing crops under heat insulation; and for domestic applications, as a defroster at high humidity places such as washroom and the like, a stool seat warmer, an electric carpet, an electric blanket, etc.

The sheet-like heating element according to the invention has excellent mechanical properties high stability against chemicals, high electric conductivities. Moreover it shows excellent workability and adhesion to metals. Accordingly, metal terminal bonding in the process of manufacturing said heating elements can notably simplified.

The heating elements show surprisingly an uniform temperature distribution over the surface and an essentially linear increase of the surface temperature with increasing applied electric power.

The following examples illustrates the invention in more detail.

EXAMPLE 1

A potentiostatic electrolytic polymerization is carded out at a current density of 2 mA/cm² applied across a pair of stainless steel electrodes disposed to oppose each other at an interval of 2 cm, using an electrolytic solution prepared by adding, as the polyanion, 0.05 molar concentration of tributylammonium salt of a sulfated polyadduct of bisphenol A diglycidyl ether and bisphenol A:

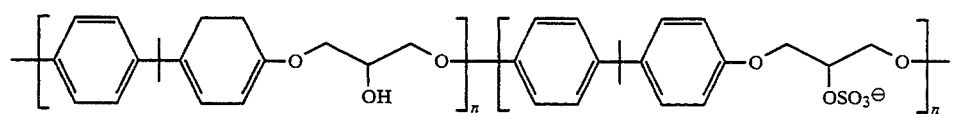

(hereinafter referred to as s-PHE) (molar ratio (MR) of the sulfated alcohol groups in the polyanionic structural unit to the entire structural repeating unit: 0.125), 10 ml of pyrrole and 2 ml of water to 200 ml of propylene carbonate to form a polypyrrole film on the anode.

The thus formed polypyrrole film is separated from the anode and washed first with propylene carbonate and then with ethanol, followed by drying at 50° C. The polypyrrole film is determined for breaking strength and elongation at break at room temperature using a Mine Materials Tester manufactured by PL Thermal Science, while electrical conductivity is determined by four probe method. The results are as shown in Table 1. It can be seen from Table 1 that the present sheet-like heating element has excellent mechanical properties.

Next, a sheet-like heating element is prepared by fixing electrodes to the above polypyrrole film, and a 0.1 A direct current was applied thereacross to measure power output. The result is as shown in Table 1.

Workability of the polypyrrole film is tested by subjecting the film to die formability test under heating to 90° C. to find that the polypyrrole film can be molded into arbitrary shapes. The result of workability test is as shown in Table 1.

EXAMPLE 2

A polypyrrole film is formed by electrolytic polymerization using an electrolytic solution prepared in the same manner as in Example 1 except that 0.05 molar concentration of tributylammonium salt of s-PHE having a MR of 0.167 is used as the polyanion, and a sheet-like heating element is prepared using the thus obtained polypyrrole film. Film thickness, breaking strength, elongation at break, electric conductivity and processability of the polypyrrole film, and power output of the resulting sheet-like heating element are determined in the same manner as in Example 1. The results are shown in Table 1.

EXAMPLE 3

A polypyrrole film is formed by electrolytic polymerization using an electrolytic solution prepared in the same manner as in Example 1 except that 0.05 molar concentration of tributylammonium salt of s-PHE having a MR of 0.5 was used as the polyanion, and a sheet-like heating element is prepared using the thus obtained polypyrrole film. Film thickness, breaking strength, elongation at break, electric conductivity and processability of the polypyrrole film, and power output of the resulting sheet-like heating element are determined in the same manner as in Example 1. The results are as shown in Table 1.

EXAMPLE 4

A polypyrrole film is formed by electrolytic polymerization using an electrolytic solution prepared in the same manner as in Example 1 except that 0.05 molar concentration of tributylammonium salt of s-PHE having a MR of 1.0 is used as the polyanion, and a sheet-like heating element was prepared using the thus obtained polypyrrole film. Film thickness, breaking strength, elongation at break, electric conductivity and processability of the polypyrrole film, and power output of the resulting sheet-like heating element are determined in the same manner as in Example 1. The results are as shown in Table 1.

EXAMPLE 5

A polypyrrole film is formed by electrolytic polymerization using an electrolytic solution prepared in the same manner as in Example 1 except that 0.05 molar concentration of tributylammonium salt of a sulfated polybutadiene (s-BUT) of the formula

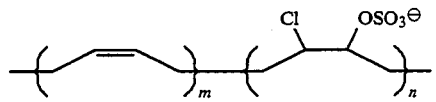

is used as the polyanion, and a sheet-like heating element is prepared using the thus obtained polypyrrole film. Film thickness, breaking strength, elongation at break, electric conductivity and processability of the polypyrrole film, and power output of the resulting sheet-like heating element are determined in the same manner as in Example 1. The results are as shown in Table 1.

COMPARATIVE EXAMPLE 1

A polypyrrole film is formed by electrolytic polymerization using an electrolytic solution prepared in the same manner as in Example 1 except that 0.05 molar concentration of tributylammonium salt of polystyrenesulfonic acid (PSS) is used as the polyanion, and a sheet-like heating element is prepared using the thus obtained polypyrrole film. Film thickness, breaking strength, elongation at break, electric conductivity and processability of the polypyrrole film, and power output of the resulting sheet-like heating element are determined in the same manner as in Example 1. The results are as shown in Table 1.

COMPARATIVE EXAMPLE 2

A polypyrrole film is formed by electrolytic polymerization using an electrolytic solution prepared in the same manner as in Example 1 except that 0.05 molar concentration of tributylammonium salt of p-toluenesulfonic acid (TS) is used as the polyanion, and a sheet-like heating element is prepared using the thus obtained polypyrrole film. Film thickness, breaking strength, elongation at break, electric conductivity and processability of the polypyrrole film, and power output of the resulting sheet-like heating element are determined in the same manner as in Example 1. The results are as shown in Table 1.

EXAMPLE 6

A 1,300 mm×600 mm piece is cut out of the polypyrrole film obtained in Example 2, and electrodes are bonded to each end thereof using a silver paste to provide a sheet-like heating element. Heat is generated by applying an electric current across the electrodes so as to determine temperature distribution at 12 points on the sheet-like heating element. It is thus found that the difference between the maximum temperature and the minimum temperature at an average surface temperature of 40° C. is ±2° C.

When an electric current of 700 mA is applied across the electrodes of the sheet-like heating element, the heating element gives a power output of about 1.9 W and a surface temperature of 63° C. The heating element has an uniform surface temperature distribution.

EXAMPLE 7

When the polypyrrole film obtained in Example 1 is heated to 180° C. and laminated onto a stainless steel net by compression bonding, the polypyrrole film shows very good adhesion to the support. Application of a carbon paste onto the stainless steel net gives an ohmic contact with no contact resistance. Accordingly, it can be seen that bonding of metal terminals in the process of manufacturing heating elements can notably be simplified.

COMPARATIVE EXAMPLE 3

When the polypyrrole films obtained in Comparative Examples 1 and 2 are laminated onto stainless steel nets in the same manner as in Example 7, respectively, these polypyrrole films show no adhesion.

TABLE 1

| | Polyanion | MR | Conductivity (S/cm) | Film thickness (μm) | Breaking strength (MPas) | Elongation at break (%) | Workability | Power out-ut (mW) |
|---|---|---|---|---|---|---|---|---|
| Example 1 | s-PHE | 0.125 | 11.3 | 90 | 112 | 115 | good | 98 |
| Example 2 | s-PHE | 0.167 | 11.8 | 62 | 120 | 160 | good | 137 |
| Example 3 | s-PHE | 0.5 | 14.9 | 95 | 128 | 130 | good | 71 |
| Example 4 | s-PHE | 1.0 | 15.2 | 100 | 62 | 33 | good | 66 |
| Example 5 | s-BUT | 0.2 | 23.3 | 120 | 189 | 295 | good | 36 |
| Control 1 | PSS | 1.0 | 4.1 | 85 | 17 | 3 | bad | 287 |
| Control 2 | TS | — | 80 | 40 | 65 | 40 | bad | 3 |

Since the sheet-like heating element according to this invention has excellent mechanical properties, workability and a high conductivity of 1 S/cm or more and also shows uniform temperature distribution when an electric power is applied and excellent adhesion with metals, metal terminal bonding in the process of manufacturing heating elements can notably be simplified.

What is claimed is

1. A heating element in the form of a sheet having a thickness of 1 to 500 μm said sheet being laminated to a support and said sheet being prepared from an electrically conductive polymer complex comprising:
    a) a polycationic of a polyheteroaromatic compound; and
    b) a polyanion of a thermoplastic polymer containing a sulfated alcohol group in the repeating structural unit thereof and having film-forming properties.

2. A heating element according to claim 1, wherein the polyheteroaromatic compound is a homopolymer or copolymer of a compound selected from the group consisting of pyrroles, thiophenes, furans, 2,2′-bipyrroles, 2,2′-bithiophenes, 2,2′-bifurans, thiazoles, oxazoles, thiadiazoles and imidazoles.

3. A heating element according to claim 1, wherein the electrically conductive polymer complex contains the structural unit of sulfated alcohol group-containing thermoplastic polymer in an amount 0.1 to 0.5 per structural unit of the polyheteroaromatic compound.

4. A heating element according to claim 1, wherein the thermoplastic polymer has a glass transition temperature of −100° to 250° C.

5. A heating element according to claim 1, wherein the molar ratio of the free alcohol group to the sulfate alcohol group in the thermoplastic polymer is 50:1 to 1:50.

6. A heating element according to claim 1, wherein the thermoplastic polymer is an at least partially sulfate polyadduct of:
    a) a glycidyl compound having on an average more than one epoxy group; and
    b) a diol which contains in the polymer chain thereof a group of the formula:

wherein said polyadduct contains:
    a) 100 to 5 mol % of identical or different structural units of the formula (I):

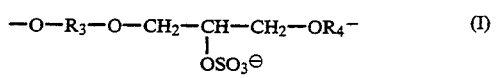

wherein $R_3$ and $R_4$ each and independently represent a radical of an aliphatic or aromatic diol group which radical is diminished by two hydroxyl groups; and
    b) 95 to 0 mol % of identical or different structural units of the formula (II):

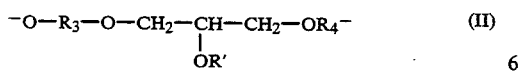

wherein $R_3$ and $R_4$ have the same meanings as defined above; R′ represents hydrogen, a $C_1$-$C_{20}$alkyl group, a $C_1$-$C_{20}$acyl or an aminocarbonyl N-substituted with $C_1$-$C_{20}$hydrocarbon group, based on the polyadduct.

7. A heating element according to claim 6, wherein $R_3$ and $R_4$ each and independently represent a group of the formula (III):

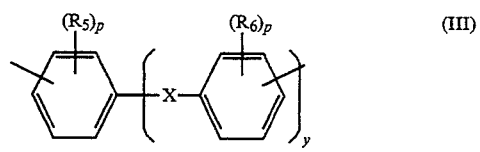

wherein X represents a direct bond, a $C_1$-$C_4$alkylene group, a $C_2$-$C_{12}$alkylidene group, a $C_5C_8$cycloalkylidene group, —O—, —S—, —SO—, —SO$_1$—, —CO—, —CO$_2$—, —N($C_1$-$C_4$alkyl)- or —Si(CH$_3$)$_2$—; $R_5$ and $R_6$ each and independently represent a hydrogen atom, a halogen atom, a $C_1$-$C_4$alkyl group or a $C_1$-$C_4$alkoxy group; p is 1 or 2; and y is 0 or 1.

8. A heating element according to claim 6, wherein $R_3$ and $R_4$ each and independently represents a group of the formula

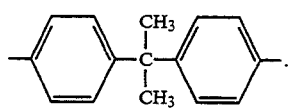

9. A heating element according to claim 1, wherein the thermoplastic polymer is an at least partially sulfated homopolymer or copolymer of an acrylate or methacrylate which contains a sulfated alcohol group in the ester moiety.

10. A heating element according to claim 9, wherein the thermoplastic polymer contains:
    a) 100 to 5 mol % of identical or different structural units represented by the formula (IV):

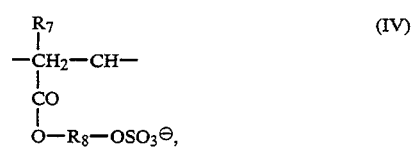

wherein $R_7$ represents a hydrogen atom or a methyl group; $R_8$ represents a linear or branched $C_2$-$C_{18}$alkylene group, a poly($C_2$-$C_6$oxaalkylene) group having 2 to 6 oxaalkylene units, a $C_5$-$C_8$cycloalkylene group, a phenylene group, a benzilene group, a xylilene group or a group of the formula:

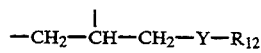

wherein Y represents —O—, —OCO— or —N($C_1$-$C_4$alkyl)—; $R_{12}$ represents a $C_1$-$C_{18}$alkyl group, a $C_5$-$C_7$cycloalkyl group, a $C_1$-$C_{12}$alkyl-substituted $C_5$-$C_7$cycloalkyl group, a phenyl group, a $C_1$-$C_{12}$alkyl-substituted phenyl group, a benzyl group or a $C_1$-$C_{12}$alkyl-substituted benzyl group; and
    b) 95 to 0 mol % of identical or different structural units of the formula (V):

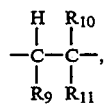
(V)

wherein $R_9$ represents a hydrogen atom, a $C_1$-$C_6$alkyl group, —$COOR_{12}$ or —COO—; $R_{10}$ represents a hydrogen atom, a fluorine atom, a chlorine atom, a cyano group or a $C_1$-$C_6$alkyl group; $R_{11}$ represents a hydrogen atom, a fluorine atom, a chlorine atom, a cyano group, $R_{12}O$—, $C_1$-$C_{12}$alkyl group, —COO—, —$COOR_{12}$, —$COOR_8$—OH, —OCO—$R_{12}$ or a phenyl group (wherein $R_8$ and $R_{12}$ have the same meanings as defined above).

11. A heating element according to claim 1, wherein the thermoplastic polymer is an at least partially sulfated homopolymer or copolymer of a polyene which contains a sulfated alcohol group in the molecule.

12. A heating element according to claim 11, wherein the thermoplastic polymer contains:

a) identical or different structural units of the formula (VI):

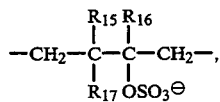
(VI)

wherein $R_{15}$, $R_{16}$ and $R_{17}$ each and independently represent a hydrogen atom, a $C_1$-$C_{20}$alkyl group or a halogen atom;

b) identical or different structural units of the formula (VII):

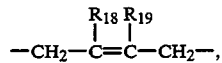
(VII)

wherein $R_{18}$ and $R_{19}$ each and independently represent a hydrogen atom, a $C_1$-$C_{20}$alkyl group or a halogen atom; and c) identical or different structural units of the formula (VIID):

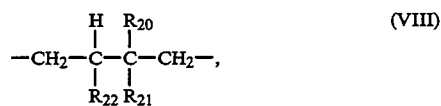
(VIII)

wherein $R_{20}$ represents a hydrogen atom, a fluorine atom, a chlorine atom, a cyano group or a $C_1$-$C_6$alkyl group; and $R_{21}$ represents a hydrogen atom, a fluorine atom, a chlorine atom, a cyano group, $R_{12}O$—, a $C_1 C_{12}$ alkyl group, —COO—, —$COOR_{12}$, —$COOR_8$—OH, —OCO—$R_{12}$ or a phenyl group; and $R_{22}$ represents a hydrogen atom, a $C_1$-$C_6$alkyl group, —$COOR_{12}$ or —COO— (wherein $R_8$ and $R_{12}$ have the same meanings as defined above).

13. A process for preparing a heating element as defined in claim 1 which comprises forming the electrically conductive polymer complex as defined in claim 1 into a sheet and subsequently laminating the sheet to a support by means of a heat roll or a heat press.

14. A process according to claim 13, wherein the sheet of the electrically conductive polymer complex is subjected to thermocompression bonding with a conductive or resistant metal.

15. A heating element according to claim 1, wherein a positive and a negative electrode are connected to the said sheet.

16. A process for heating the environment with a heating element, said heating element comprising a sheet prepared from an electrically conductive polymer complex comprising a) a polycationic of a polyheteroaromatic compound and b) a polyanion of thermoplastic polymer containing a sulfated alcohol group in the repeating structure unit thereof and having film-forming properties, said sheet being connected to two electrodes, and wherein electrical power is applied through said electrodes to heat the heating element.

* * * * *